(12) United States Patent
Weber et al.

(10) Patent No.: US 10,240,465 B2
(45) Date of Patent: Mar. 26, 2019

(54) COOLING CIRCUITS FOR A MULTI-WALL BLADE

(71) Applicant: General Electric Company, Schenectady, NY (US)

(72) Inventors: David Wayne Weber, Simpsonville, SC (US); Robert Peter Hanet, Canton, MI (US); Gregory Thomas Foster, Greer, SC (US); Brendon James Leary, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 15/334,454

(22) Filed: Oct. 26, 2016

(65) Prior Publication Data

US 2018/0112539 A1  Apr. 26, 2018

(51) Int. Cl.
*F01D 5/18* (2006.01)
*F01D 5/14* (2006.01)
(Continued)

(52) U.S. Cl.
CPC ............ *F01D 5/187* (2013.01); *F01D 5/147* (2013.01); *F01D 9/041* (2013.01); *F02C 3/04* (2013.01); *F05D 2220/32* (2013.01); *F05D 2240/122* (2013.01); *F05D 2240/304* (2013.01); *F05D 2240/35* (2013.01); *F05D 2250/185* (2013.01); *F05D 2260/202* (2013.01); *F05D 2260/205* (2013.01)

(58) Field of Classification Search
CPC .... F01D 5/187; F01D 25/12; F05D 2240/304; F05D 2260/204
See application file for complete search history.

(56) References Cited

U.S. PATENT DOCUMENTS 3,844,679 A   10/1974  Grondahl et al.
4,761,116 A    8/1988  Braddy et al.
(Continued)

FOREIGN PATENT DOCUMENTS

| EP | 1 001 137 A2 | 5/2000 |
| EP | 3 112 594 A1 | 1/2017 |
| GB | 2 163 219 A  | 2/1986 |

OTHER PUBLICATIONS

Ekkad, S.V. and Han, J., "Local Heat Transfer Distributions Near a Sharp 180° Turn of a Two-Pass Smooth Square Channel Using a Transient Liquid Crystal Image Technique," Journal of Flow Visualization and Image Processing, vol. 2, Issue.3, pp. 285-297 (1995).
(Continued)

*Primary Examiner* — Ninh H. Nguyen
(74) *Attorney, Agent, or Firm* — Ernest G. Cusick; Hoffman Warnick LLC

(57) ABSTRACT

A trailing edge cooling system for a multi-wall blade, including: a set of outward legs extending toward a trailing edge of the multi-wall blade and fluidly coupled to a coolant feed; a set of return legs extending away from the trailing edge of the multi-wall blade and fluidly coupled to a coolant collection passage; and a connecting system for fluidly coupling the set of outward legs and the set of return legs; wherein the set of outward legs is radially offset from the set of return legs along a radial axis of the multi-wall blade.

20 Claims, 11 Drawing Sheets

(51) Int. Cl.
*F02C 3/04* (2006.01)
*F01D 9/04* (2006.01)

(56) References Cited

U.S. PATENT DOCUMENTS

| | | | |
|---|---|---|---|
| 4,940,388 A | 7/1990 | Lilleker et al. | |
| 5,915,923 A | 6/1999 | Tomita et al. | |
| 6,499,949 B2 | 12/2002 | Schafrik et al. | |
| 6,547,525 B2 * | 4/2003 | Haehnle | B22C 9/10 |
| | | | 415/115 |
| 7,435,053 B2 | 10/2008 | Liang | |
| 7,530,789 B1 | 5/2009 | Liang | |
| 7,670,113 B1 | 3/2010 | Liang | |
| 7,717,675 B1 | 5/2010 | Liang | |
| 7,845,906 B2 | 12/2010 | Spangler et al. | |
| 7,985,049 B1 | 7/2011 | Liang | |
| 8,322,988 B1 | 12/2012 | Downs et al. | |
| 8,398,370 B1 | 3/2013 | Liang | |
| 8,562,295 B1 | 10/2013 | Liang | |
| 8,608,430 B1 | 12/2013 | Liang | |
| 8,678,766 B1 * | 3/2014 | Liang | F01D 5/187 |
| | | | 416/97 R |
| 8,864,469 B1 | 10/2014 | Liang | |
| 9,447,692 B1 | 9/2016 | Liang | |
| 9,970,302 B2 * | 5/2018 | Lacy | F01D 5/187 |
| 2008/0050241 A1 | 2/2008 | Liang | |
| 2009/0193657 A1 | 8/2009 | Wilson, Jr. et al. | |
| 2010/0303625 A1 | 12/2010 | Kuhne et al. | |
| 2013/0272850 A1 | 10/2013 | Bunker | |
| 2014/0093379 A1 | 4/2014 | Tibbott et al. | |
| 2014/0127013 A1 | 5/2014 | Spangler et al. | |
| 2015/0041590 A1 | 2/2015 | Kirtley et al. | |
| 2015/0044059 A1 | 2/2015 | Wassynger et al. | |
| 2015/0096305 A1 | 4/2015 | Morgan et al. | |
| 2015/0147164 A1 | 5/2015 | Cui et al. | |
| 2016/0169003 A1 | 6/2016 | Wong et al. | |
| 2016/0177741 A1 | 6/2016 | Kirollos et al. | |
| 2017/0234154 A1 * | 8/2017 | Downs | F01D 5/189 |
| | | | 415/177 |
| 2018/0112533 A1 | 4/2018 | Weber | |
| 2018/0112534 A1 | 4/2018 | Snider et al. | |
| 2018/0112535 A1 | 4/2018 | Weber et al. | |
| 2018/0112536 A1 | 4/2018 | Weber et al. | |
| 2018/0112537 A1 | 4/2018 | Weber et al. | |
| 2018/0112538 A1 | 4/2018 | Weber et al. | |
| 2018/0112540 A1 | 4/2018 | Hoskin et al. | |
| 2018/0112541 A1 | 4/2018 | Weber et al. | |
| 2018/0112547 A1 | 4/2018 | Snider et al. | |

OTHER PUBLICATIONS

Extended European search report and Opinion issued in connection with corresponding EP Application No. 17197311.8 dated Jan. 29, 2018.
U.S. Appl. No. 15/334,483, Office Action dated Jun. 28, 2018, 13 pages.
U.S. Appl. No. 15/334,585, Office Action dated Jul. 31, 2018, 22 pages.
U.S. Appl. No. 15/334,517, Office Action dated Aug. 6, 2018, 24 pages.
U.S. Appl. No. 15/334,501, Office Action dated Aug. 10, 2018, 17 pages.
U.S. Appl. No. 15/334,450, Office Action dated Aug. 15, 2018, 49 pages.

* cited by examiner

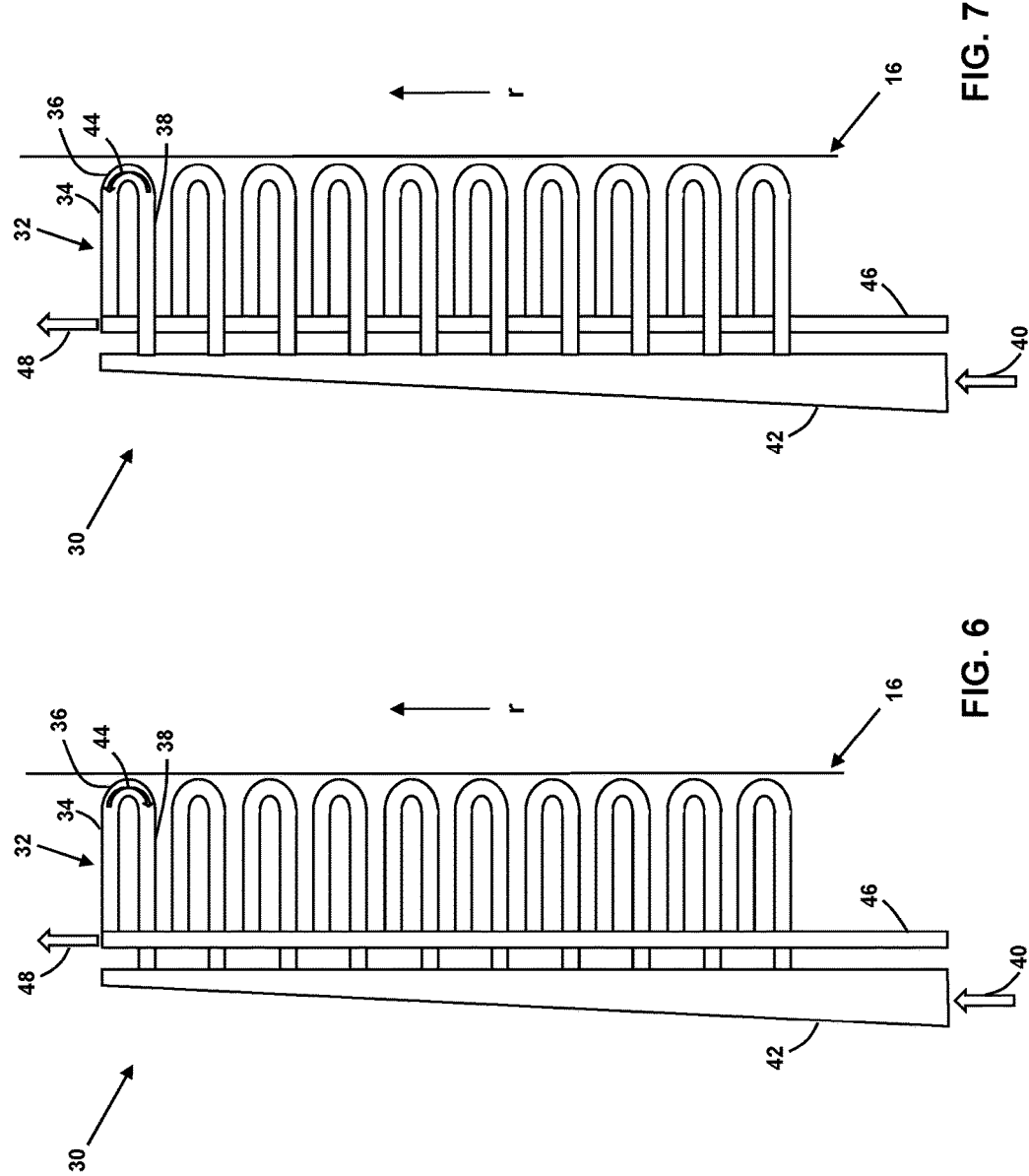

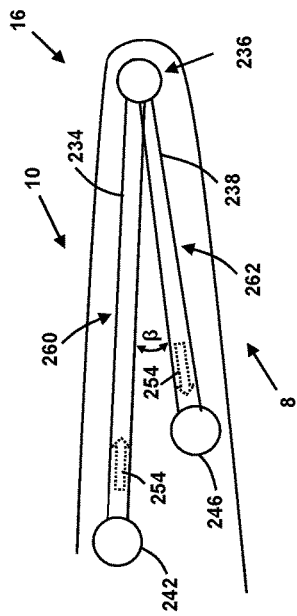
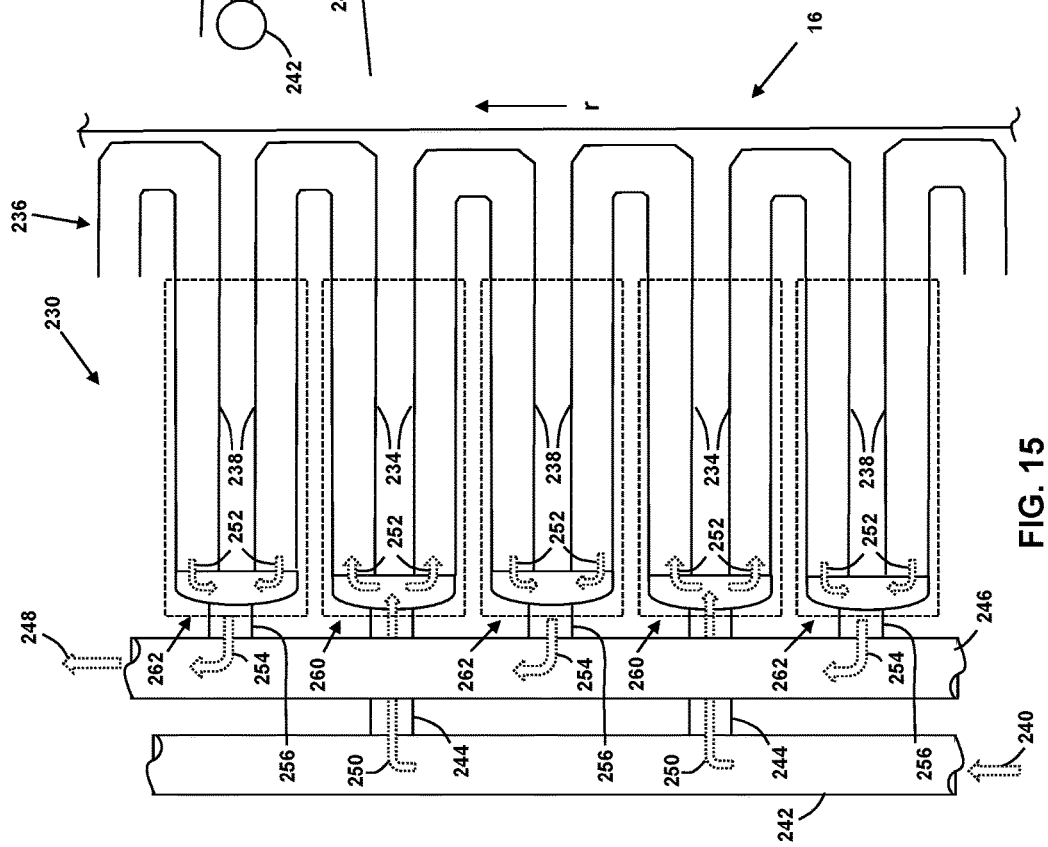
FIG. 16
FIG. 15

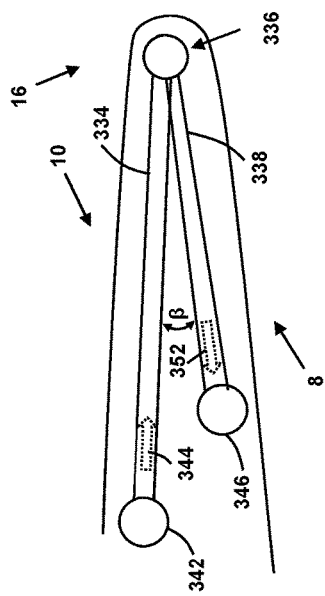
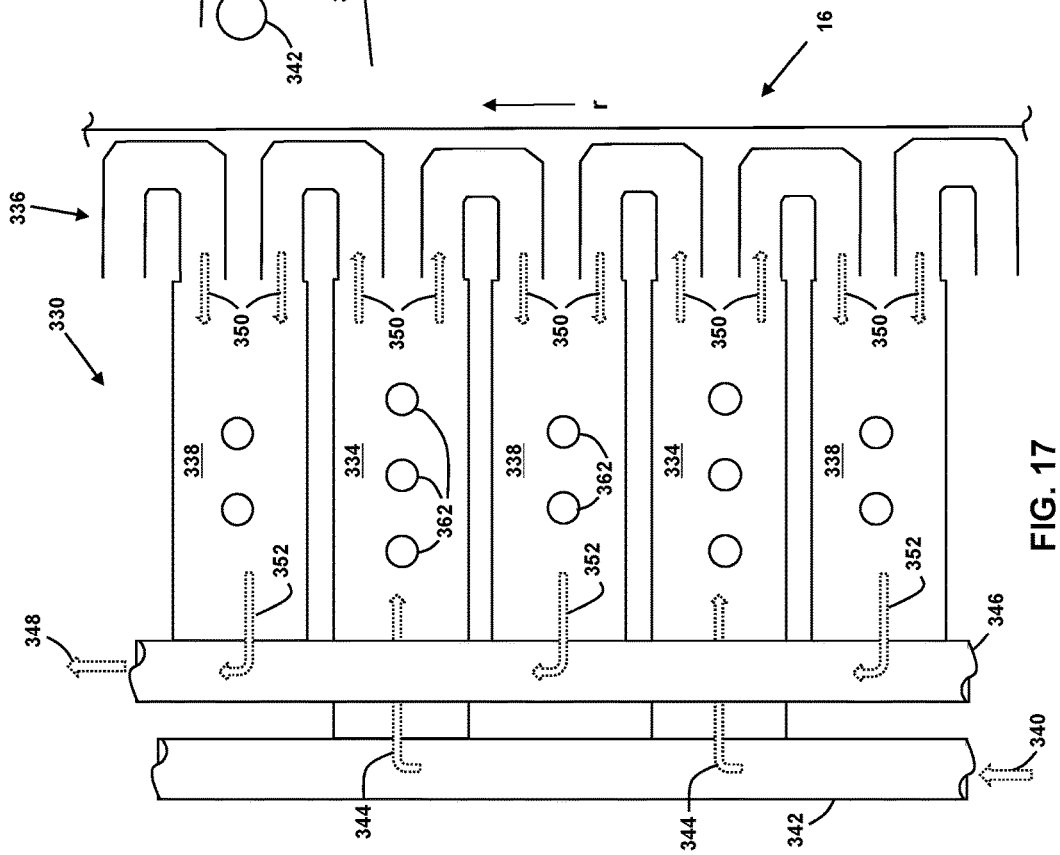
FIG. 18
FIG. 17

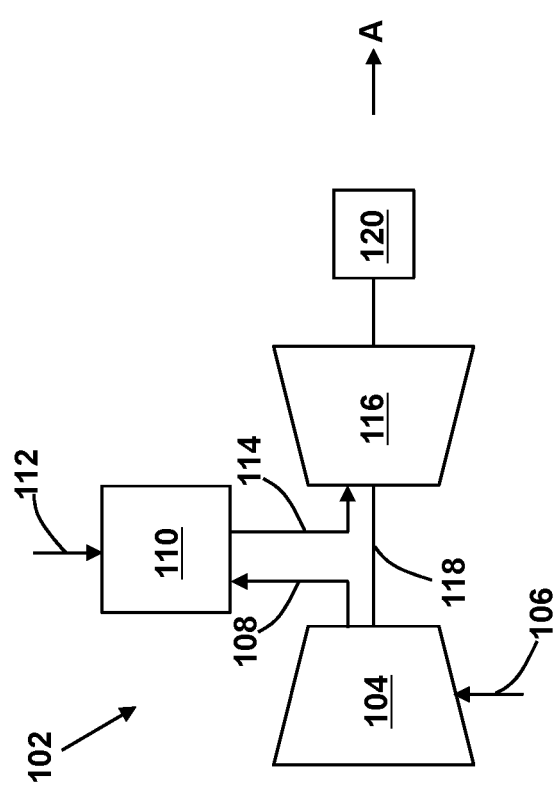

COOLING CIRCUITS FOR A MULTI-WALL BLADE

RELATED APPLICATIONS

This application is related to co-pending U.S. application Ser. Nos. 15/334,474, 15/334,563, 15/334,585, 15/334,448, 15/334,501, 15/334,517, 15/334,450, 15/334,471 and 15/334,483, all filed on Oct. 26, 2016.

BACKGROUND OF THE INVENTION

The disclosure relates generally to turbine systems, and more particularly, to cooling circuits for a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades and nozzles, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

A multi-wall blade typically contains an intricate maze of internal cooling passages. Cooling air (or other suitable coolant) provided by, for example, a compressor of a gas turbine system, may be passed through and out of the cooling passages to cool various portions of the multi-wall blade. Cooling circuits formed by one or more cooling passages in a multi-wall blade may include, for example, internal near wall cooling circuits, internal central cooling circuits, tip cooling circuits, and cooling circuits adjacent the leading and trailing edges of the multi-wall blade.

BRIEF DESCRIPTION OF THE INVENTION

A first aspect of the disclosure provides a trailing edge cooling system for a multi-wall blade, including: a set of outward legs extending toward a trailing edge of the multi-wall blade and fluidly coupled to a coolant feed; a set of return legs extending away from the trailing edge of the multi-wall blade and fluidly coupled to a coolant collection passage; and a connecting system for fluidly coupling the set of outward legs and the set of return legs; wherein the set of outward legs is radially offset from the set of return legs along a radial axis of the multi-wall blade.

A second aspect of the disclosure provides a multi-wall turbine blade including a trailing edge cooling system disposed within the multi-wall turbine blade. The trailing edge cooling system includes: a set of outward legs extending toward a trailing edge of the multi-wall blade and fluidly coupled to a coolant feed; a set of return legs extending away from the trailing edge of the multi-wall blade and fluidly coupled to a coolant collection passage; and a connecting system for fluidly coupling the set of outward legs and the set of return legs; wherein the set of outward legs is radially offset from the set of return legs along a radial axis of the multi-wall blade.

A third aspect of the disclosure provides turbomachine including a compressor component, a combustor component, and a turbine component, the turbine component including a plurality of turbine blades. At least one of the turbine blades is a multi-wall blade. The turbomachine further including a trailing edge cooling system disposed within the multi-wall blade, the trailing edge cooling system including: a set of outward legs extending toward a trailing edge of the multi-wall blade and fluidly coupled to a coolant feed; a set of return legs extending away from the trailing edge of the multi-wall blade and fluidly coupled to a coolant collection passage; and a connecting system for fluidly coupling the set of outward legs and the set of return legs; wherein the set of outward legs is radially offset from the set of return legs along a radial axis of the multi-wall blade.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

FIG. 6 is a side view of a trailing edge cooling circuit according to various embodiments.

FIG. 7 is a side view of a trailing edge cooling circuit according to various embodiments.

FIG. 15 is a side view of a portion of a trailing edge cooling circuit according to various embodiments.

FIG. 16 is a top cross-sectional view of the trailing edge cooling circuit of FIG. 15 according to various embodiments.

FIG. 17 is a side view of a portion of a trailing edge cooling circuit according to various embodiments.

FIG. 18 is a top cross-sectional view of the trailing edge cooling circuit of FIG. 17 according to various embodiments.

FIG. 19 is a schematic diagram of a gas turbine system according to various embodiments.

Figure 1:
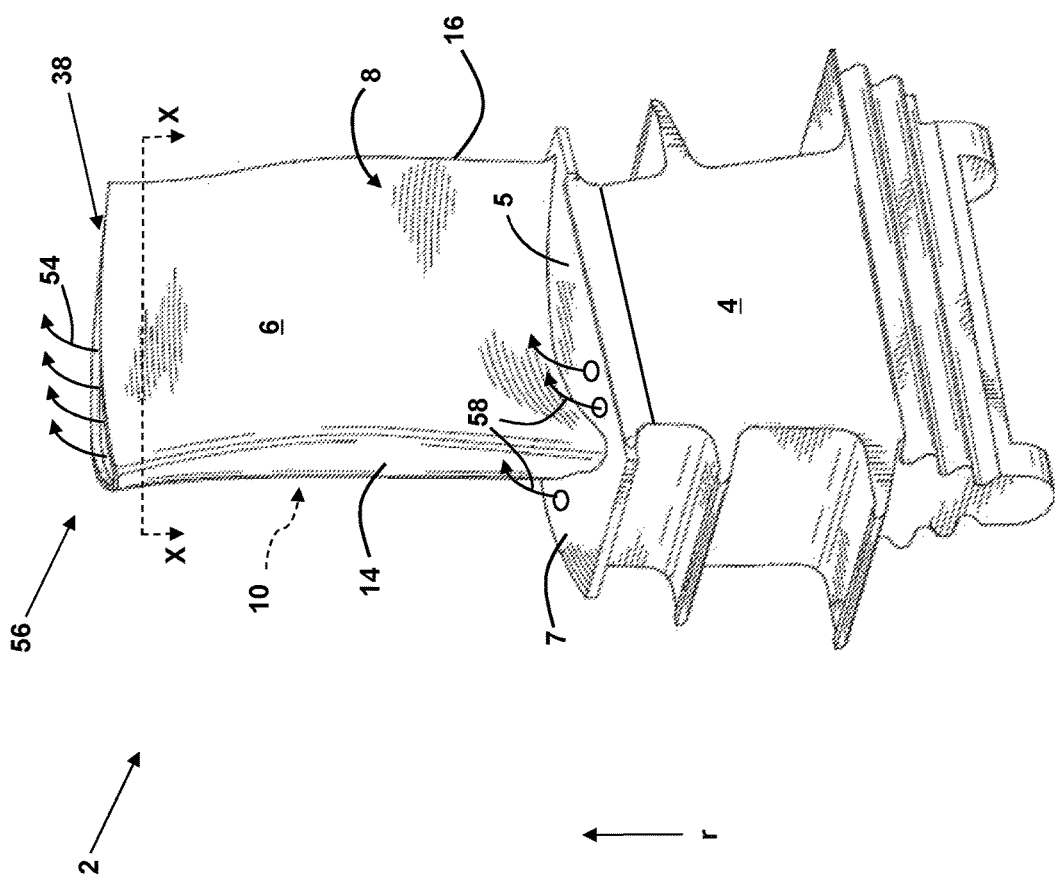
FIG. 1 is a perspective view of a multi-wall blade according to various embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure relates generally to turbine systems, and more particularly, to cooling circuits for a multi-wall blade. A multi-wall blade may include, for example, a turbine blade or a nozzle of a turbine system.

According to embodiments, a trailing edge cooling circuit with flow reuse is provided for cooling a multi-wall blade of a turbine system (e.g., a gas turbine system). A flow of cooling air is reused after flowing through the trailing edge cooling circuit. After passing through the trailing edge cooling circuit, the flow of cooling air may be collected and used to cool other sections of the multi-wall blade. For example, the flow of cooling air may be directed to at least one of the pressure or suction sides of the multi-wall blade for convection and/or film cooling. Further, the flow of cooling air may be provided to other cooling circuits within the multi-wall blade, including tip, and platform cooling circuits. Although described herein with regard to a multi-wall blade, the trailing edge cooling circuit may be used for cooling the trailing edge area of other types of turbine blades.

Traditional trailing edge cooling circuits typically eject the flow of cooling air out of a multi-wall blade after it flows through a trailing edge cooling circuit. This is not an efficient use of the cooling air, since the cooling air may not have been used to its maximum heat capacity before being exhausted from the multi-wall blade. Contrastingly, according to embodiments, a flow of cooling air, after passing through a trailing edge cooling circuit, is used for further cooling of the multi-wall blade.

In the Figures (see, e.g., FIG. 19), the "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along an axis "r" (see, e.g., FIG. 1), which is substantially perpendicular with axis A and intersects axis A at only one location. Finally, the term "circumferential" refers to movement or position around axis A.

Turning to FIG. 1, a perspective view of a turbine blade 2 is shown. The turbine blade 2 includes a shank 4 and a multi-wall blade 6 (also referred to as a multi-wall airfoil) coupled to and extending radially outward from the shank 4. The multi-wall blade 6 includes a pressure side 8, an opposed suction side 10, and a tip area 52. The multi-wall blade 6 further includes a leading edge 14 between the pressure side 8 and the suction side 10, as well as a trailing edge 16 between the pressure side 8 and the suction side 10 on a side opposing the leading edge 14. The multi-wall blade 6 extends radially away from a pressure side platform 5 and a suction side platform 7.

The shank 4 and multi-wall blade 6 may each be formed of one or more metals (e.g., nickel, alloys of nickel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism).

Figure 2:
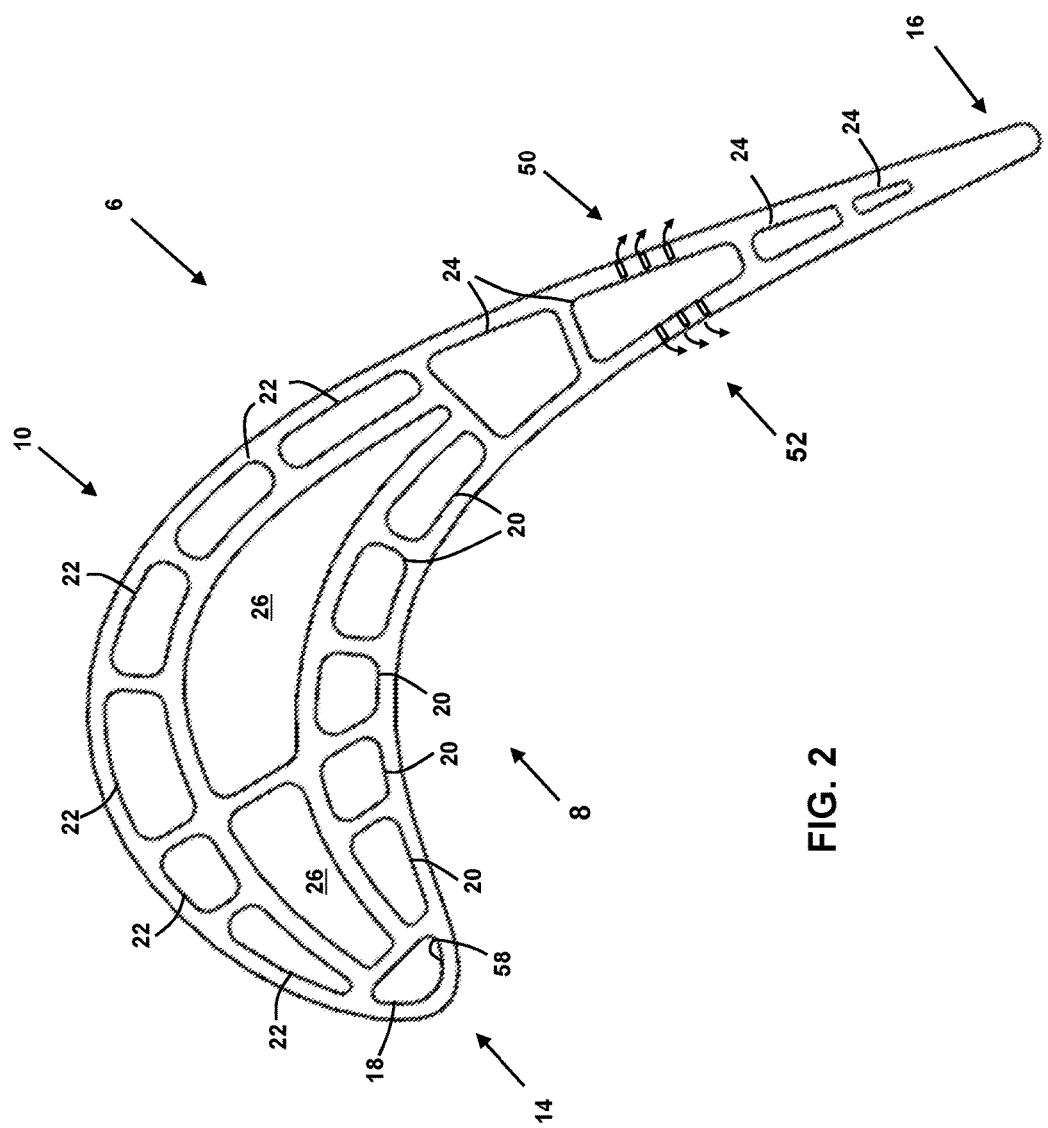
FIG. 2 is a cross-sectional view of the multi-wall blade of FIG. 1, taken along line X-X in FIG. 1 according to various embodiments.

FIG. 2 depicts a cross-sectional view of the multi-wall blade 6 taken along line X-X of FIG. 1. As shown, the multi-wall blade 6 may include a plurality of internal passages. In embodiments, the multi-wall blade 6 includes at least one leading edge passage 18, at least one pressure side (near wall) passage 20, at least one suction side (near wall) passage 22, at least one trailing edge passage 24, and at least one central passage 26. The number of passages 18, 20, 22, 24, 26 within the multi-wall blade 6 may vary, of course, depending upon for example, the specific configuration, size, intended use, etc., of the multi-wall blade 6. To this extent, the number of passages 18, 20, 22, 24, 26 shown in the embodiments disclosed herein is not meant to be limiting. According to embodiments, various cooling circuits can be provided using different combinations of the passages 18, 20, 22, 24, 26.

An embodiment including a trailing edge cooling circuit 30 is depicted in FIGS. 3-6. The trailing edge cooling circuit 30 is located adjacent the trailing edge 16 of the multi-wall blade 6, between the pressure side 8 and suction side 10 of the multi-wall blade 6.

The trailing edge cooling circuit 30 includes a plurality of radially spaced (i.e., along the "r" axis (see, e.g., FIG. 1)) cooling circuits 32 (only two are shown), each including an outward leg 34, a turn 36, and a return leg 38. The outward leg 34 extends axially toward the trailing edge 16 of the multi-wall blade 6. The return leg 38 extends axially toward the leading edge 14 of the multi-wall blade. The outward and return legs 34, 38 may follow the contour of the suction and pressure sides 10, 8 of the multi-wall blade 6. In embodiments, the trailing edge cooling circuit 30 may extend along the entire radial length L (FIG. 5) of trailing edge 16 of the multi-wall blade 6. In other embodiments, the trailing edge cooling circuit 30 may partially extend along one or more portions of the trailing edge 16 of the multi-wall blade 6.

Figure 5:
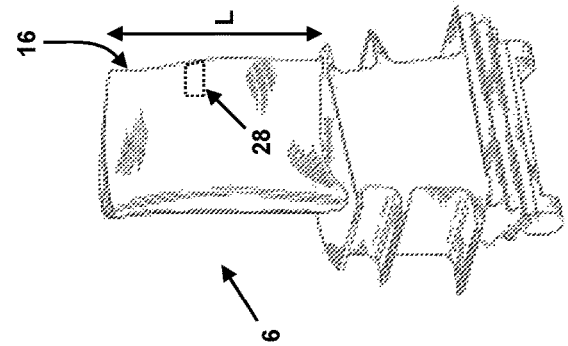
FIG. 5 depicts the section shown in FIGS. 3 and 4 of the multi-wall blade of FIG. 1 according to various embodiments.
Figure 3:
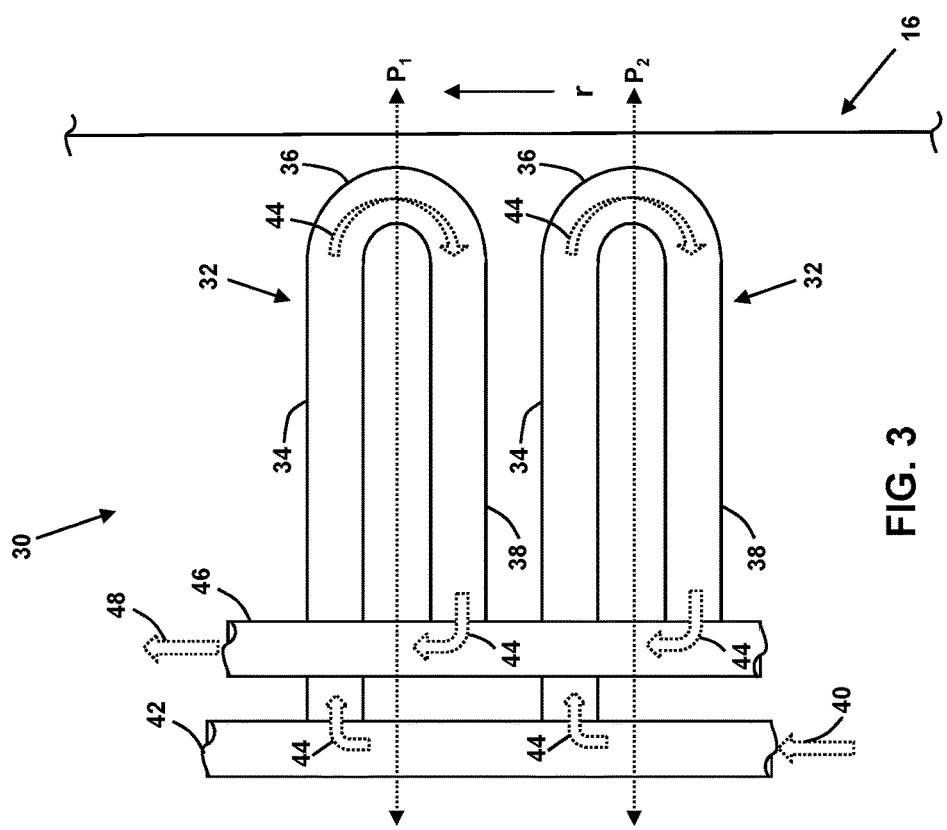
FIG. 3 is a side view of a portion of a trailing edge cooling circuit according to various embodiments.

In each cooling circuit 32, the outward leg 34 is radially offset along the "r" axis relative to the return leg 38 by the turn 36. To this extent, the turn 36 fluidly couples the outward leg 34 of the cooling circuit 32, which is disposed at a first radial plane $P_1$, to the return leg 38 of the cooling circuit 32, which is disposed in a second radial plane $P_2$, different from the first radial plane $P_1$. In the non-limiting embodiment shown in FIG. 3, for example, the outward leg 34 is positioned radially outward relative to the return leg 36 in each of the cooling circuits 32. In other embodiments, in one or more of the cooling circuits 32, the radial positioning of the outward leg 34 relative to the return leg 38 may be reversed such that the outward leg 34 is positioned radially inward relative to the return leg 36. A non-limiting position 28 of the portion of the trailing edge cooling circuit 30 depicted in FIG. 3 within the multi-wall blade 6 is illustrated in FIG. 5.

Figure 4:
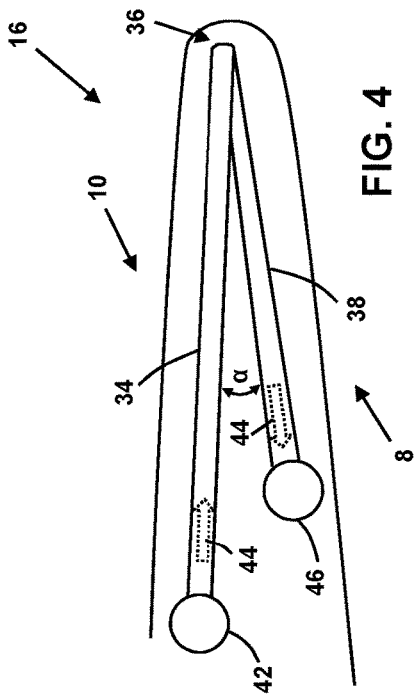
FIG. 4 is a top cross-sectional view of the trailing edge cooling circuit of FIG. 3 according to various embodiments.

As shown in FIG. 4, in addition to a radial offset, the outward leg 34 may be circumferentially offset by the turn 36 at an angle α relative to the return leg 38. In this configuration, the outward leg 34 extends along the suction side 10 of the multi-wall blade 6, while the return leg 38 extends along the pressure side 8 of the multi-wall blade 6 (see, e.g., FIGS. 3, 4, and 6). In other embodiments, the outward leg 34 may extend along the pressure side 8 of the multi-wall blade 6, while the return leg 38 may extend along the suction side 10 of the multi-wall blade 6 (see, e.g., FIG. 7). The radial and circumferential offsets may vary, for example, based on geometric and heat capacity constraints on the trailing edge cooling circuit 30 and/or other factors. The circumferential offset may be the same for each cooling circuit 32 or may change based, for example, on the radial position of the cooling circuit 32 in the trailing edge 16 of the multi-wall blade.

A flow of cooling air 40 (or other suitable coolant), generated for example by a compressor 104 of a gas turbine system 102 (FIG. 19), flows into the trailing edge cooling circuit 30 via at least one coolant feed (e.g., cool air feed 42). In general, any suitable type of coolant may be used. Each cool air feed 42 may be formed, for example, using one or more of the trailing edge passages 24 depicted in FIG. 2 or may be provided using any other suitable source of cooling air in the multi-wall blade 6. At each cooling circuit 32, a portion 44 of the flow of cooling air 40 passes into the outward leg 34 of the cooling circuit 32 and flows towards the turn 36. The flow of cooling air 44 is redirected (e.g., reversed) by the turn 36 of the cooling circuit 32 and flows into the return leg 38 of the cooling circuit 32. The flow of cooling air 44 passing into each outward leg 34 may be the same for each cooling circuit 32, or may be different for different sets (i.e., one or more) of the cooling circuits 32.

According to embodiments, the flows of cooling air 44 from a plurality of the cooling circuits 32 of the trailing edge cooling circuit 30 flow out of the return legs 38 of the cooling circuits 32 into a collection passage 46. A single collection passage 46 may be provided, however multiple collection passages 46 may also be utilized. The collection passage 46 may be formed, for example, using one or more of the trailing edge passages 24 depicted in FIG. 2 or may be provided using one or more other passages within the multi-wall blade 6. Although shown as flowing radially outward through the collection passage 46 in FIG. 3, the "used" cooling air may instead flow radially inward through the collection passage 46.

The cooling air 48, or a portion thereof, flowing into and through the collection passage 46 may be directed (e.g. using one or more passages (e.g., passages 18-24) and/or other passages within the multi-wall blade 6) to one or more additional cooling circuits of the multi-wall blade 6. To this extent, at least some of the remaining heat capacity of the cooling air 48 is exploited for cooling purposes instead of being inefficiently expelled from the trailing edge 16 of the multi-wall blade 6.

The cooling air 48, or a portion thereof, may be used to provide film cooling to various areas of the multi-wall blade. For example, as depicted in FIG. 2, the cooling air 48 may be used to provide cooling film 50 to one or more locations along the suction side 10 of the multi-wall blade 6 (including at the trailing edge 16), cooling film 52 to one or more locations along the pressure side 8 of the multi-wall blade 6 (including at the trailing edge 16), and cooling film 50, 52 to one or more locations along both the pressure and suction sides 8, 10 of the multi-wall blade 6 (including at the trailing edge 16). Additionally, the cooling air 48 may be used to provide cooling film 54 to one or more locations along a tip area 56 of the multi-wall blade 6, and/or to provide cooling film 58 to one or more locations along the pressure side and/or suction side platforms 5, 7 of the multi-wall blade.

Figure 9:
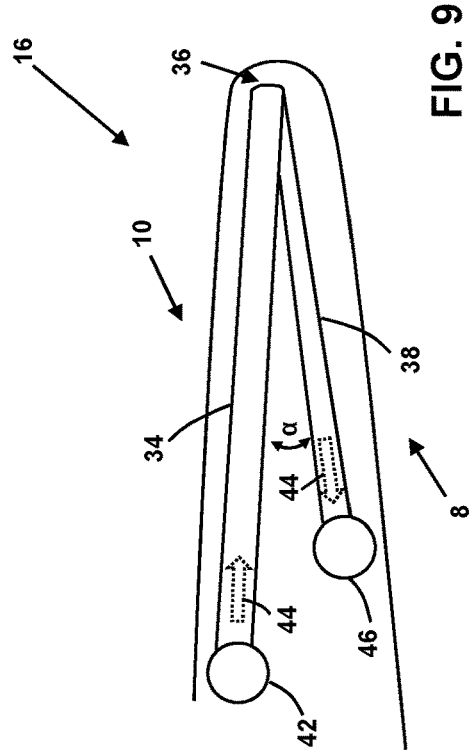
FIG. 9 is a top cross-sectional view of the trailing edge cooling circuit of FIG. 8 according to various embodiments.
Figure 8:
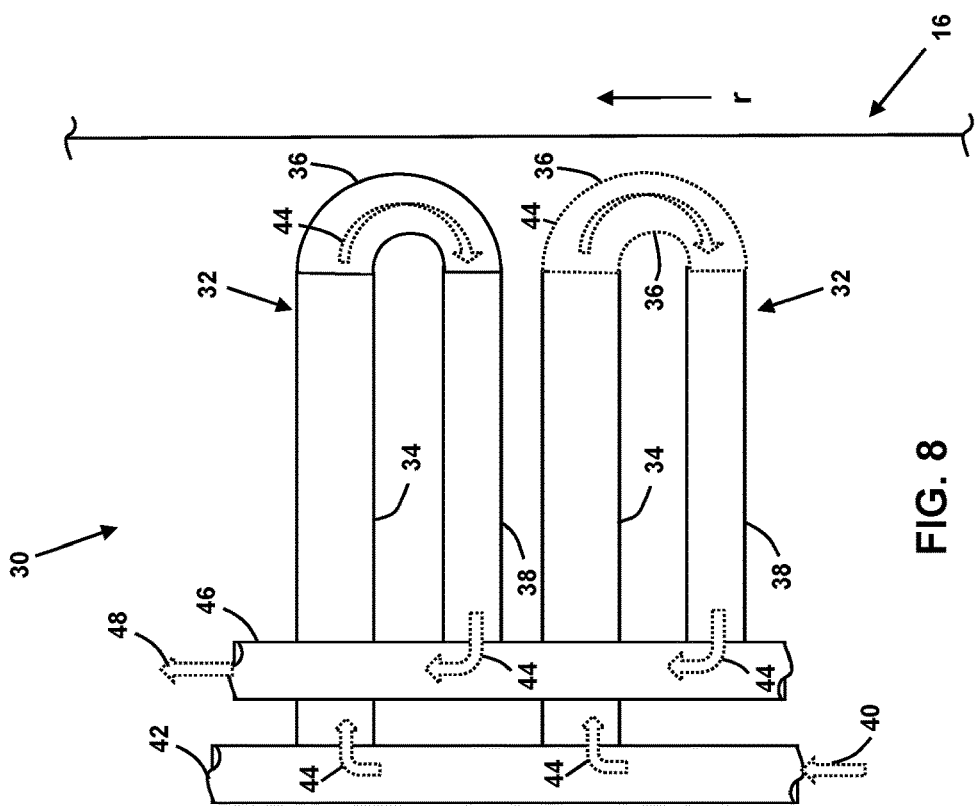
FIG. 8 is a side view of a portion of a trailing edge cooling circuit according to various embodiments.

In embodiments, the outward and return legs 34, 38 of one or more of the cooling circuits 32 in the trailing edge cooling circuit 30 may have different sizes. For example, as depicted in FIGS. 8 and 9, the outward leg 34 in each cooling circuit 32 may be larger (e.g., to enhance heat transfer) than the return leg 38. The size of the outward leg 34 may be increased, for example, by increasing at least one of the radial height and the lateral width of the outward leg 34. In other embodiments, the outward leg 34 may be smaller than the return leg 38.

Figure 10:
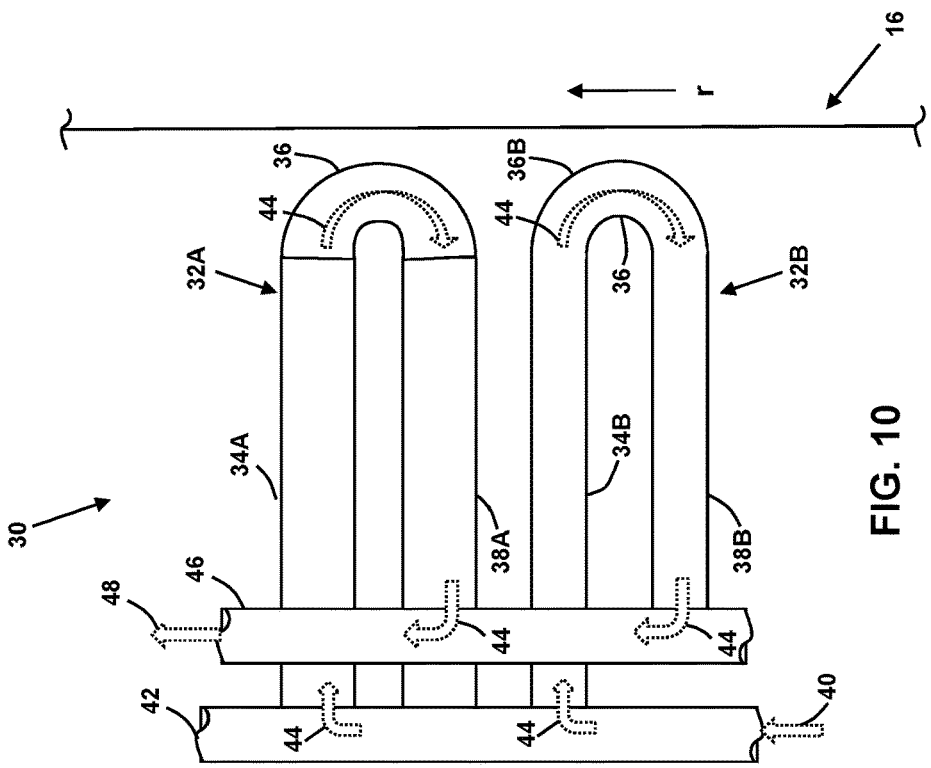
FIG. 10 is a side view of a portion of a trailing edge cooling circuit according to various embodiments.

In further embodiments, the sizes of the outward leg 34 and/or return leg 38 in the cooling circuits 32 in the trailing edge cooling circuit 30 may vary, for example, based on the relative radial position of the cooling circuits 32 within the trailing edge 16 of the multi-wall blade 6. For example, as depicted in FIG. 10, the outward leg 34A and/or the return leg 38A of the radially outward cooling circuit 32A may be larger in size (e.g., to enhance heat transfer) than the outward leg 34B and the return leg 38B, respectively, of the cooling circuit 32B.

Figure 11:
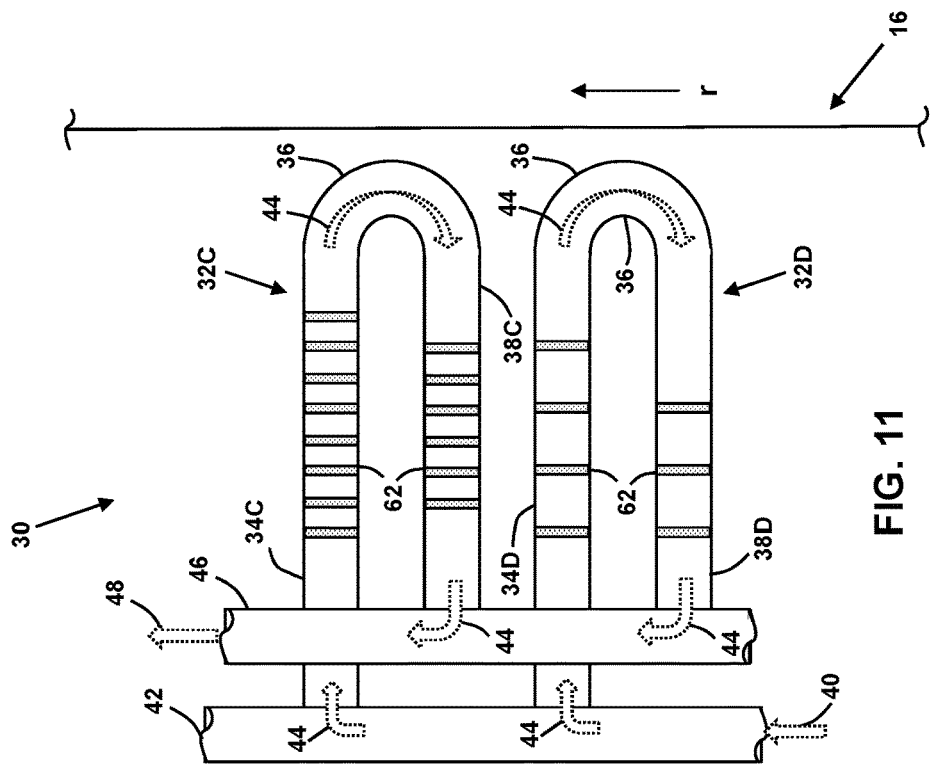
FIG. 11 is a side view of a portion of a trailing edge cooling circuit according to various embodiments.

In additional embodiments, obstructions may be provided within at least one of the outward leg 34 or return leg 38 in at least one of the cooling circuits 32 in the trailing edge cooling circuit 30. The obstructions may include, for example, metal pins, bumps, fins, plugs, and/or the like. Further, the density of the obstructions may vary based on the relative radial position of the cooling circuits 32 within the multi-wall blade 6. For example, as depicted in FIG. 11, a set of obstructions 62 may be provided in the outward leg 34C and the return leg 38C of the radially outward cooling circuit 32C, and in the outward leg 34D and the return leg 38D of the cooling circuit 32D. The density of the obstructions 62 may be higher (e.g., to enhance heat transfer) in the outward legs 34C, 34D compared to the density of obstructions 62 in the return legs 38C, 38D, respectively. Further, the relative density of the obstructions 62 may be higher (e.g., to enhance heat transfer) in the radially outward cooling circuit 32C compared to the cooling circuit 32D.

Figure 13:
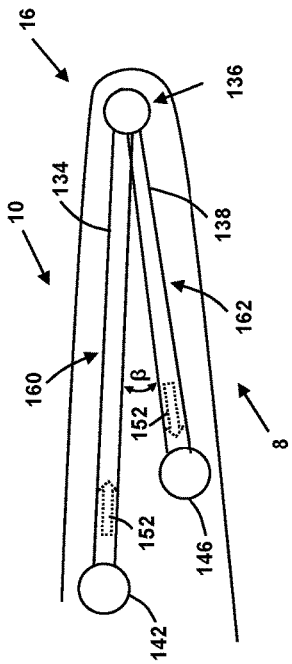
FIG. 13 is a top cross-sectional view of the trailing edge cooling circuit of FIG. 12 according to various embodiments.
Figure 12:
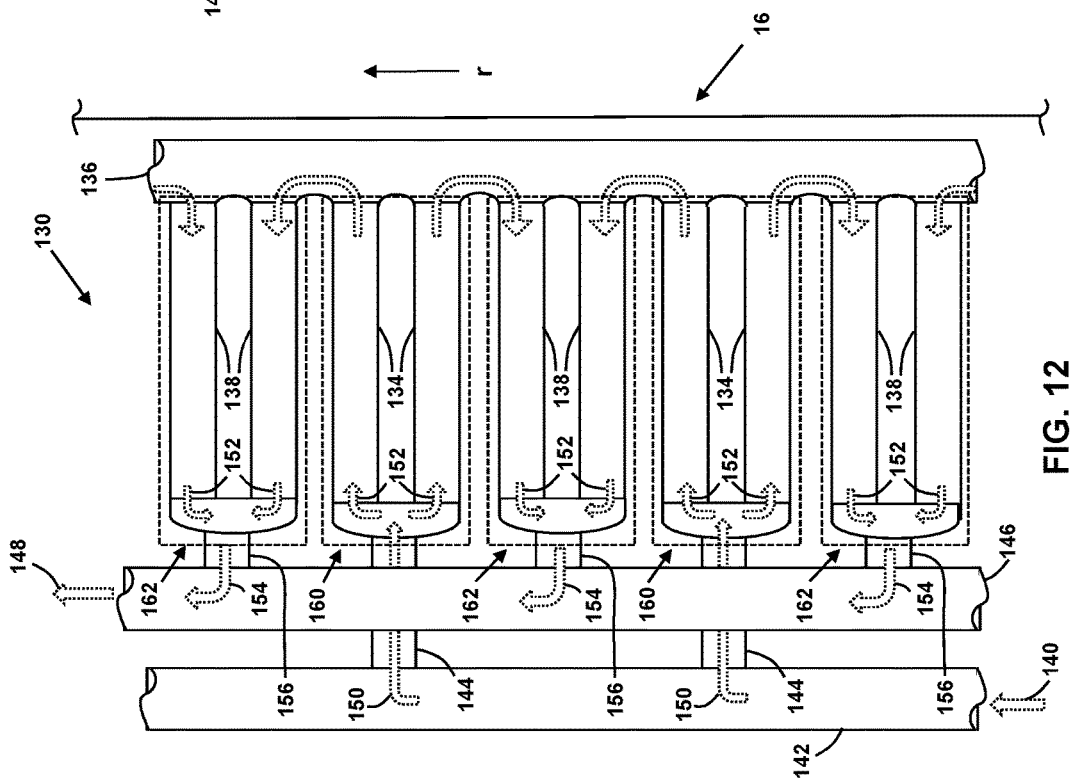
FIG. 12 is a side view of a portion of a trailing edge cooling circuit according to various embodiments.
Figure 14:
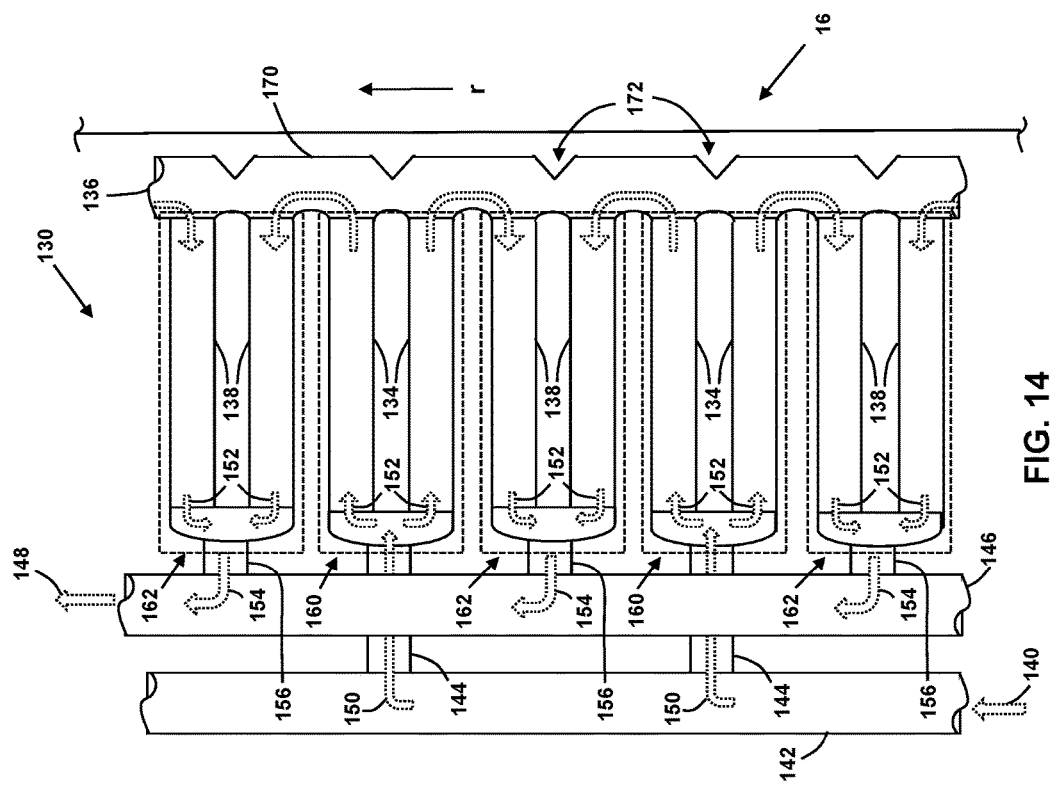
FIG. 14 is a side view of a portion of a trailing edge cooling circuit according to various embodiments.

In some embodiments, a plurality of the outward and return legs may be ganged together to form a trailing edge cooling circuit. This may be useful, for example, to reduce pressure losses and/or even out pressure drops within the trailing edge cooling circuit and, in come cases, to simplify manufacturing of the multi-wall blade 6. A first example of such a trailing edge cooling circuit 130 according to embodiments is depicted in FIGS. 12-14. A second example of such a trailing edge cooling circuit 230 according to embodiments is depicted in FIGS. 15 and 16. A further example of a trailing edge cooling circuit 330 according to embodiments is depicted in FIGS. 17 and 18.

The trailing edge cooling circuit 130 includes a plurality of outward legs 134, a plurality of return legs 138, and an aft connection 136 that fluidly couples the plurality of outward legs 134 and the plurality of return legs 138. Each outward leg 134 extends axially toward the trailing edge 16 of the multi-wall blade 6. Each return leg 138 extends axially toward the leading edge 14 of the multi-wall blade. The outward and return legs 134, 138 may follow the contour of the suction and pressure sides 10, 8 of the multi-wall blade 6. In embodiments, the trailing edge cooling circuit 130 may extend along the entire radial length L (FIG. 5) of trailing edge 16 of the multi-wall blade 6. In other embodiments, the trailing edge cooling circuit 130 may partially extend along one or more portions of the trailing edge 16 of the multi-wall blade 6.

A plurality of the outward legs 134 may be ganged together into sets 160 as shown in FIG. 12, with each set 160 including at least two outward legs 134. Further, a plurality of the return legs 138 may be ganged together into sets 162, with each set 162 including at least two return legs 138. According to embodiments, the sets 160, 162 of outward and return legs 134, 138 may be radially spaced (i.e., along the "r" axis) in an alternating sequence along at least a portion of the radial length L (FIG. 5) of the trailing edge 16 of the multi-wall blade 6.

As shown in FIG. 13, in addition to a radial offset, each set 160 of outward legs 134 may be circumferentially offset at an angle β relative to at least one adjacent set 162 of return legs 138. In the illustrated configuration, each set 160 of outward legs 134 extends along the suction side 10 of the multi-wall blade 6, while each set of return leg 138 extends along the pressure side 8 of the multi-wall blade 6. The radial and circumferential offsets may vary, for example, based on geometric and heat capacity constraints on the trailing edge cooling circuit 130 and/or other factors. In other embodiments, each set 160 of outward legs 134 may extend along the pressure side 8 of the multi-wall blade 6, while each set of return leg 138 may extend along the suction side 10 of the multi-wall blade 6.

A flow of cooling air 140 (or other suitable coolant), generated for example by a compressor 104 of a gas turbine system 102 (FIG. 19), flows into the trailing edge cooling circuit 130 via at least one coolant feed (e.g., cool air feed 142). Each cool air feed 142 may be formed, for example, using one or more of the trailing edge passages 24 depicted in FIG. 2 or may be provided using any other suitable source of cooling air in the multi-wall blade 6.

Passages 144 fluidly couple the cool air feed 142 to each set 160 of outward legs 134. A portion 150 of the flow of cooling air 140 passes into each set 160 of outward legs 134 through the passage 144 and is divided into separate flows 152, which pass through the outward legs 134 toward the aft connection 136.

The separate flows 152 pass into the aft connection 136. The aft connection 136 is configured to redirect each separate flow 152 into an adjacent return leg 138 of a set 162 of return legs 138. The separate flows 152 in the return legs 138 of each set 162 of return legs 138 combine into a flow 154, which flows into a collection passage 146 through a passage 156. The flows 154 combine within the collection passage 146 to form a flow of cooling air 148.

According to embodiments, a single collection passage 146 may be provided, however multiple collection passages 146 may also be utilized. The collection passage 146 may be formed, for example, using one or more of the trailing edge passages 24 depicted in FIG. 2 or may be provided using one or more other passages within the multi-wall blade 6. Although shown as flowing radially outward through the collection passage 146 in FIG. 13, the "used" cooling air may instead flow radially inward through the collection passage 146.

The combined flow of cooling air 148, or a portion thereof, flowing into and through the collection passage 146 may be directed (e.g. using one or more passages (e.g., passages 18-24) and/or other passages within the multi-wall blade 6) to one or more additional cooling circuits of the multi-wall blade 6. To this extent, at least some of the remaining heat capacity of the flow of cooling air 148 may be exploited for cooling purposes instead of being inefficiently expelled from the trailing edge 16 of the multi-wall blade 6.

In embodiments, the outward and/or return legs 134, 138 of one or more of the sets 160, 162 in the trailing edge cooling circuit 130 may have different sizes. For example, the outward legs 134 in each set 160 may be larger than the return legs 138 in each set 162. In further embodiments, the sizes of the outward legs 134 and/or return legs 138 in one or more of the sets 160, 162 in the trailing edge cooling circuit 130 may vary, for example, based on the relative radial position of the sets 160, 162 within the trailing edge 16 of the multi-wall blade 6. In additional embodiments, obstructions may be provided within at least some of the outward and return legs 134, 138 in the trailing edge cooling circuit 130.

As shown in FIG. 14, a trailing edge surface 170 of the aft connection 136 may include a plurality of contoured portions 172, which extend toward the interior of the aft connection 136. The contoured portions 172 are oriented along the aft connection 136 at points between the outward legs 134 of each set 160 of outward legs 134 and at points located between the return legs 138 of each set 162 of return legs 138. Each contoured portion 172 directs (e.g., turns) a respective flow 152 of cooling air entering into the aft connection 136 from an outward leg 134 into an adjacent return leg 138. This configuration reduces fluid dead zones in the trailing edge cooling circuit 130, improves heat transfer, reduces pressure drops, and provides strength for manufacturing.

As depicted in FIG. 15, the trailing edge cooling circuit 230 includes a plurality of outward legs 234, a plurality of return legs 238, and a plurality of turns 236 for fluidly coupling the plurality of outward legs 234 and the plurality of return legs 238. Each outward leg 234 extends axially toward the trailing edge 16 of the multi-wall blade 6. Each return leg 238 extends axially toward the leading edge 14 of the multi-wall blade. The outward and return legs 234, 238 may follow the contour of the suction and pressure sides 10, 8 of the multi-wall blade 6. In embodiments, the trailing edge cooling circuit 230 may extend along the entire radial length L (FIG. 5) of trailing edge 16 of the multi-wall blade 6. In other embodiments, the trailing edge cooling circuit 230 may partially extend along one or more portions of the trailing edge 16 of the multi-wall blade 6.

A plurality of the outward legs 234 may be ganged together into sets 260 as shown in FIG. 15. Further, a plurality of the return legs 238 may be ganged together into sets 262. According to embodiments, the sets 260, 262 of outward and return legs 234, 238 may be radially spaced (i.e., along the "r" axis) in an alternating sequence along at least a portion of the radial length L (FIG. 5) of the trailing edge 16 of the multi-wall blade 6.

As shown in FIG. 16, in addition to a radial offset, each set 260 of outward legs 234 may be circumferentially offset at an angle β relative to at least one adjacent set 262 of return legs 238. In the illustrated configuration, each set 260 of outward legs 234 extends along the suction side 10 of the multi-wall blade 6, while each set of return leg 138 extends along the pressure side 8 of the multi-wall blade 6. The radial and circumferential offsets may vary, for example, based on geometric and heat capacity constraints on the trailing edge cooling circuit 230 and/or other factors. In other embodiments, each set 260 of outward legs 234 may extend along the pressure side 8 of the multi-wall blade 6, while each set of return leg 238 may extend along the suction side 10 of the multi-wall blade 6.

A flow of cooling air 240 (or other suitable coolant), generated for example by a compressor 104 of a gas turbine system 102 (FIG. 19), flows into the trailing edge cooling circuit 230 via at least one coolant feed (e.g., cool air feed 242). Each cool air feed 242 may be formed, for example, using one or more of the trailing edge passages 24 depicted in FIG. 2 or may be provided using any other suitable source of cooling air in the multi-wall blade 6.

A passage 244 fluidly couples the cool air feed 242 to each set 260 of outward legs 234. A portion 250 of the flow of cooling air 240 passes into each set 260 of outward legs 234 through the passage 244 and is divided into separate flows 252. Each separate flow 252 passes through an outward leg 234 and into an adjacent return leg 236 via a corresponding turn 236. To this extent, the flow 252 is redirected (e.g., reversed) by the turn 236 and flows into the adjacent return leg 238. The flows 252 in the return legs 238 of each set 262 of return legs 238 combine into a flow 254, which flows into a collection passage 246 through a passage 256. The flows 254 combine within the collection passage 246 to form a flow of cooling air 248.

According to embodiments, a single collection passage 246 may be provided, however multiple collection passages 246 may also be utilized. The collection passage 246 may be formed, for example, using one of the trailing edge passages 24 depicted in FIG. 2 or may be provided using one or more other passages within the multi-wall blade 6. Although shown as flowing radially outward through the collection passage 246 in FIG. 15, the "used" flow of cooling air 248 may instead flow radially inward through the collection passage 246.

The combined flow of cooling air 248, or a portion thereof, flowing into and through the collection passage 246 may be directed (e.g. using one or more passages (e.g., passages 18-24) and/or other passages within the multi-wall blade 6) to one or more additional cooling circuits of the multi-wall blade 6. To this extent, at least some of the remaining heat capacity of the flow of cooling air 248 may be exploited for cooling purposes instead of being inefficiently expelled from the trailing edge 16 of the multi-wall blade 6.

In embodiments, the outward and/or return legs 234, 238 of one or more of the sets 260, 262 of legs in the trailing edge cooling circuit 230 may have different sizes. For example, the outward legs 234 in each set 260 may be larger than the return legs 258 in each set 262. In further embodiments, the sizes of the outward legs 234 and/or return legs 238 in one or more of the sets 260, 262 in the trailing edge cooling circuit 230 may vary, for example, based on the relative radial position of the sets 260, 262 within the trailing edge 16 of the multi-wall blade 6. In additional embodiments, obstructions may be provided within at least some of the sets 260, 262 in the trailing edge cooling circuit 230. The configuration depicted in FIG. 15 reduces fluid dead zones in the trailing edge cooling circuit 230, improves heat transfer, reduces pressure drops, and provides strength for manufacturing.

In other embodiments, as shown in FIG. 17, each set 260 of outward legs 234 in the embodiment depicted in FIG. 15 may be replaced with a single outward leg 334, while each set 262 of return legs 238 may be replaced with a single return leg 338. A plurality of turns 336 are provided for fluidly coupling each outward leg 334 to a plurality of adjacent return legs 338.

In the trailing edge cooling circuit 330 depicted in FIG. 17, each outward leg 334 extends axially toward the trailing edge 16 of the multi-wall blade 6. Each return leg 338 extends axially toward the leading edge 14 of the multi-wall blade. The outward and return legs 334, 338 may follow the contour of the suction and pressure sides 10, 8 of the multi-wall blade 6. In embodiments, the trailing edge cooling circuit 330 may extend along the entire radial length L (FIG. 5) of trailing edge 16 of the multi-wall blade 6. In other embodiments, the trailing edge cooling circuit 330 may partially extend along one or more portions of the trailing edge 16 of the multi-wall blade 6. The outward and return legs 334, 338 may be radially spaced (i.e., along the "r" axis) in an alternating sequence along at least a portion of the radial length L (FIG. 5) of the trailing edge 16 of the multi-wall blade 6.

As shown in FIG. 18, each outward leg 334 may be circumferentially offset at an angle β relative to at least one adjacent return leg 338. In the illustrated configuration, each outward legs 334 extends along the suction side 10 of the multi-wall blade 6, while return leg 338 extends along the pressure side 8 of the multi-wall blade 6. The radial and circumferential offsets may vary, for example, based on geometric and heat capacity constraints on the trailing edge cooling circuit 330 and/or other factors. In other embodiments, each outward leg 334 may extend along the pressure side 8 of the multi-wall blade 6, while each return leg 338 may extend along the suction side 10 of the multi-wall blade 6.

A flow of cooling air 340 (or other suitable coolant), generated for example by a compressor 104 of a gas turbine system 102 (FIG. 19), flows into the trailing edge cooling circuit 330 via at least one coolant feed (e.g., cool air feed 342). Each cool air feed 342 may be formed, for example, using one or more of the trailing edge passages 24 depicted in FIG. 2 or may be provided using any other suitable source of cooling air in the multi-wall blade 6.

A portion 344 of the flow of cooling air 340 passes into each outward leg 334 and flows towards the turns 336 that are fluidly coupled to the outward leg 334. The flow of cooling air 344 is split among the turns 336, with a portion 350 of the flow of cooling air 344 entering each turn 336. Each turn 336 redirects (e.g., reverses) the flow of cooling air 350 into a respective adjacent return leg 338. The flows of cooling air 350 in each return leg 338 merge to form a combined flow of cooling air 352, which flows into a collection passage 346. The flows 352 combine within the collection passage 346 to form a flow of cooling air 348.

According to embodiments, a single collection passage 346 may be provided, however multiple collection passages 346 may also be utilized. The collection passage 346 may be formed, for example, using one or more of the trailing edge passages 24 depicted in FIG. 2 or may be provided using one or more other passages within the multi-wall blade 6. Although shown as flowing radially outward through the collection passage 346 in FIG. 15, the "used" flow of cooling air 348 may instead flow radially inward through the collection passage 346.

The flow of cooling air 348, or a portion thereof, flowing into and through the collection passage 346 may be directed (e.g. using one or more passages (e.g., passages 18-24) and/or other passages within the multi-wall blade 6) to one or more additional cooling circuits of the multi-wall blade 6. To this extent, at least some of the remaining heat capacity of the flow of cooling air 348 may be exploited for cooling purposes instead of being inefficiently expelled from the trailing edge 16 of the multi-wall blade 6.

In embodiments, the outward and return legs 334, 338 may have different sizes. For example, the outward legs 334 may be larger than the return legs 358. In further embodiments, the sizes of the outward legs 334 and return legs 338 may vary, for example, based on the relative radial position of the outward and return legs 334, 338 within the trailing edge 16 of the multi-wall blade 6. In additional embodiments, obstructions 362, including, for example, metal pins, bumps, fins, plugs, and/or the like, may be provided within at least some of the outward and/or return legs 334, 338 to enhance heat transfer. The configuration depicted in FIG. 17 reduces fluid dead zones in the trailing edge cooling circuit 330, improves heat transfer, reduces pressure drops, and provides strength for manufacturing.

FIG. 19 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbine system 102 may include any number of combustors 110. The flow of combustion gases 114 is in turn delivered to a turbine 116, which typically includes a plurality of the turbine blades 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

To provide additional cooling of the trailing edge of multi-wall airfoil/blade and/or to provide cooling film directly to the trailing edge, exhaust passages (not shown) may pass from any part of any of the cooling circuit(s) described herein through the trailing edge and out of the trailing edge and/or out of a side of the airfoil/blade adjacent to the trailing edge. Each exhaust passage(s) may be sized and/or positioned within the trailing edge to receive only a portion (e.g., less than half) of the coolant flowing in particular cooling circuit(s). Even with the inclusion of the exhaust passages(s), the majority (e.g., more than half) of the coolant may still flow through the cooling circuit(s), and specifically the return leg thereof, to subsequently be provided to distinct portions of multi-wall airfoil/blade for other purposes as described herein, e.g., film and/or impingement cooling.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding). Fluidly coupled refers to a coupling through which a fluid can flow.

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A trailing edge cooling system for a multi-wall blade, comprising:
   a set of outward legs extending toward a trailing edge of the multi-wall blade and fluidly coupled to a coolant feed;
   a set of return legs extending away from the trailing edge of the multi-wall blade and fluidly coupled to a coolant collection passage; and
   a connecting system for fluidly coupling the set of outward legs and the set of return legs;
   wherein the set of outward legs is radially offset from the set of return legs along a radial axis of the multi-wall blade.

2. The trailing edge cooling system according to claim 1, wherein the set of return legs is circumferentially offset relative to the set of outward legs.

3. The trailing edge cooling system according to claim 2, wherein the set of outward legs extends along a suction side of the multi-wall blade and the set of return legs extends along a pressure side of the multi-wall blade, or wherein the set of outward legs extends along the pressure side of the multi-wall blade and the set of return legs extends along the suction side of the multi-wall blade.

4. The trailing edge cooling system according to claim 1, wherein the coolant feed is fluidly coupled to a plurality of sets of outward legs, and wherein the coolant collection passage is fluidly coupled to a plurality of sets of return legs.

5. The trailing edge cooling system according to claim 4, wherein a first outward leg in a given set of outward legs is fluidly coupled by the connecting system to a return leg in an adjacent set of return legs, and wherein a second outward leg in the given set of outward legs is fluidly coupled by the connecting system to a return leg in another adjacent set of return legs.

6. The trailing edge cooling system according to claim 5, wherein the connecting system comprises an aft connection, the aft connection connecting the outward legs of each set of outward legs and the return legs of each set of return legs.

7. The trailing edge cooling system according to claim 6, wherein the aft connection includes contoured portions positioned at points between the outward legs of each set of outward legs and between the return legs of each set of return legs.

8. The trailing edge cooling system according to claim 5, wherein the connecting system comprises a plurality of turns.

9. The trailing edge cooling system according to claim 4, wherein an outward leg in a given set of outward legs is fluidly coupled by a first turn to a return leg in an adjacent set of return legs, and wherein the outward leg in the given set of outward legs is fluidly coupled by a second turn to a return leg in another adjacent set of return legs.

10. The trailing edge cooling system according to claim 9, wherein the given set of outward legs includes a single outward leg.

11. The trailing edge cooling system according to claim 10, wherein the adjacent sets of return legs each include a single return leg.

12. A multi-wall turbine blade, comprising:
a trailing edge cooling system disposed within the multi-wall turbine blade, the trailing edge cooling system comprising:
  a set of outward legs extending toward a trailing edge of the multi-wall blade and fluidly coupled to a coolant feed;
  a set of return legs extending away from the trailing edge of the multi-wall blade and fluidly coupled to a coolant collection passage; and
  a connecting system for fluidly coupling the set of outward legs and the set of return legs;
  wherein the set of outward legs is radially offset from the set of return legs along a radial axis of the multi-wall blade.

13. The multi-wall turbine blade according to claim 12, wherein the set of return legs is circumferentially offset relative to the set of outward legs.

14. The multi-wall turbine blade according to claim 12, wherein the set of outward legs extends along a suction side of the multi-wall blade and the set of return legs extends along a pressure side of the multi-wall blade, or wherein the set of outward legs extends along the pressure side of the multi-wall blade and the set of return legs extends along the suction side of the multi-wall blade.

15. The multi-wall turbine blade according to claim 12, wherein the coolant feed is fluidly coupled to a plurality of sets of outward legs, and wherein the coolant collection passage is fluidly coupled to a plurality of sets of return legs.

16. The multi-wall turbine blade according to claim 15, wherein a first outward leg in a given set of outward legs is fluidly coupled by the connecting system to a return leg in an adjacent set of return legs, and wherein a second outward leg in the given set of outward legs is fluidly coupled by the connecting system to a return leg in another adjacent set of return legs.

17. The multi-wall turbine blade according to claim 16, wherein the connecting system comprises an aft connection, the aft connection connecting the outward legs of each set of outward legs and the return legs of each set of return legs.

18. The multi-wall turbine blade according to claim 17, wherein the aft connection includes contoured portions positioned at points between the outward legs of each set of outward legs and between the return legs of each set of return legs.

19. The multi-wall turbine blade according to claim 15, wherein the connecting system comprises a plurality of turns, and wherein an outward leg in a given set of outward legs is fluidly coupled by a first turn to a return leg in an adjacent set of return legs, and wherein the outward leg in the given set of outward legs is fluidly coupled by a second turn to a return leg in another adjacent set of return legs.

20. A turbomachine, comprising:
a gas turbine system including a compressor component, a combustor component, and a turbine component, the turbine component including a plurality of turbine blades, at least one of the turbine blades including a multi-wall blade; and
a trailing edge cooling system disposed within the multi-wall blade, the trailing edge cooling system including:
  a set of outward legs extending toward a trailing edge of the multi-wall blade and fluidly coupled to a coolant feed;
  a set of return legs extending away from the trailing edge of the multi-wall blade and fluidly coupled to a coolant collection passage; and
  a connecting system for fluidly coupling the set of outward legs and the set of return legs;
  wherein the set of outward legs is radially and circumferentially offset from the set of return legs along a radial axis of the multi-wall blade.

* * * * *